US010831186B2

(12) United States Patent
Van Niekerk et al.

(10) Patent No.: US 10,831,186 B2
(45) Date of Patent: Nov. 10, 2020

(54) SYSTEM FOR AUTHORING, EXECUTING, AND DISTRIBUTING UNMANNED AERIAL VEHICLE FLIGHT-BEHAVIOR PROFILES

(71) Applicant: Vantage Robotics, LLC, San Francisco, CA (US)

(72) Inventors: Johannes Becker Van Niekerk, Livermore, CA (US); Tobin Fisher, San Francisco, CA (US)

(73) Assignee: Vantage Robotics, LLC, San Francisco, CA (US)

( * ) Notice: Subject to any disclaimer, the term of this patent is extended or adjusted under 35 U.S.C. 154(b) by 103 days.

(21) Appl. No.: 15/099,381

(22) Filed: Apr. 14, 2016

(65) Prior Publication Data

US 2016/0306351 A1    Oct. 20, 2016

Related U.S. Application Data

(60) Provisional application No. 62/147,529, filed on Apr. 14, 2015.

(51) Int. Cl.
*G05D 1/00* (2006.01)
*H04W 4/02* (2018.01)
(Continued)

(52) U.S. Cl.
CPC ......... *G05D 1/0016* (2013.01); *B64C 39/024* (2013.01); *G01S 19/13* (2013.01);
(Continued)

(58) Field of Classification Search
CPC ............ B64C 39/024; B64C 2201/141; B64C 2201/024; G05D 1/102
See application file for complete search history.

(56) References Cited

U.S. PATENT DOCUMENTS

2007/0273557 A1    11/2007  Baillot
2012/0232718 A1*    9/2012  Rischmuller .......... A63H 27/12
                                            701/2
(Continued)

FOREIGN PATENT DOCUMENTS

WO    WO 2014/200604        12/2014
WO    WO-2015014116 A1 *    2/2015  .......... B64C 39/024
WO    WO 2016/127192        8/2016

OTHER PUBLICATIONS

Partial International Search Report dated Jan. 30, 2017 for Application No. PCT/US2016/027550.

*Primary Examiner* — Hussein Elchanti
(74) *Attorney, Agent, or Firm* — Knobbe, Martens, Olson & Bear, LLP

(57) ABSTRACT

A method is provided for allowing UAV pilots to create a flight path profile and upload the same to a central server, allowing access to other UAV pilots. The method includes the steps of having creating a first flight path profile, uploading the flight path profile to a central server, allowing access of the flight path profile to others, and downloading the first flight path profile to a UAV so that the UAV follows the downloaded first flight profile. The flight path profile includes control of three dimensional motion and orientation of a UAV, control of the view orientation of a camera, as well as other camera settings such as video and still image modes, frame rate, and exposure, altitude and speed and dwell times.

15 Claims, 14 Drawing Sheets

(51) Int. Cl.
  *H04W 4/021* (2018.01)
  *B64C 39/02* (2006.01)
  *G01S 19/13* (2010.01)
  *H04W 4/70* (2018.01)

(52) U.S. Cl.
  CPC ......... *G05D 1/0033* (2013.01); *G05D 1/0044* (2013.01); *G05D 1/0094* (2013.01); *H04W 4/021* (2013.01); *H04W 4/026* (2013.01); *H04W 4/70* (2018.02); *B64C 2201/027* (2013.01); *B64C 2201/127* (2013.01); *B64C 2201/141* (2013.01); *B64C 2201/146* (2013.01)

(56) References Cited

U.S. PATENT DOCUMENTS

| | | | |
|---|---|---|---|
| 2013/0176423 A1* | 7/2013 | Rischmuller | G05D 1/0038 348/114 |
| 2013/0206915 A1* | 8/2013 | Desaulniers | B64C 39/024 244/165 |
| 2013/0329041 A1 | 12/2013 | Schatzberg et al. | |
| 2014/0008496 A1* | 1/2014 | Ye | B64C 13/20 244/190 |
| 2014/0099853 A1* | 4/2014 | Condon | G05D 1/0033 446/37 |
| 2014/0138477 A1* | 5/2014 | Keennon | B64C 27/12 244/17.23 |
| 2014/0249693 A1* | 9/2014 | Stark | B64C 39/024 701/2 |
| 2014/0277847 A1* | 9/2014 | Cann | B25J 5/007 701/2 |
| 2015/0031345 A1* | 1/2015 | Hyde | H01Q 1/241 455/418 |
| 2015/0149000 A1* | 5/2015 | Rischmuller | B64C 39/024 701/7 |
| 2015/0321758 A1* | 11/2015 | Sarna, II | B64C 39/024 244/63 |
| 2016/0132052 A1* | 5/2016 | Seydoux | G05D 1/0022 701/2 |
| 2016/0137293 A1* | 5/2016 | Santangelo | B64C 39/024 244/50 |
| 2016/0139596 A1* | 5/2016 | Na | B64C 39/024 701/2 |
| 2016/0200438 A1* | 7/2016 | Bokeno | B64C 39/024 244/2 |
| 2016/0214713 A1* | 7/2016 | Cragg | B64C 39/024 |
| 2016/0214715 A1* | 7/2016 | Meffert | B64C 39/024 |
| 2016/0274582 A1* | 9/2016 | Banda | B64C 39/024 |

* cited by examiner

SYSTEM FOR AUTHORING, EXECUTING, AND DISTRIBUTING UNMANNED AERIAL VEHICLE FLIGHT-BEHAVIOR PROFILES

CROSS-REFERENCE TO RELATED APPLICATIONS

This application claims the benefit of U.S. Provisional Application No. 62/147,529, filed Apr. 14, 2015, entitled SYSTEM FOR AUTHORING, EXECUTING, AND DISTRIBUTING UNMANNED AERIAL VEHICLE FLIGHT BEHAVIOR PROFILES, which is hereby incorporated by reference in its entirety.

BACKGROUND

Technical Field

Embodiments described herein relate to the field of unmanned aerial vehicles (UAV), such as quadcopters. Specifically, certain embodiments are directed to the creation, execution, management, and sharing of UAV flight behavior data files.

Description of the Related Art

Remotely controlled UAVs are valued for their ability to operate remotely in areas difficult to reach using traditional manned aircraft.

SUMMARY

Some innovations relate to a portable electronic device, including one or more sensors configured to sense the position and orientation of the portable electronic device, and a processor, the processor configured to generate instructions for controlling a UAV, the instructions for controlling a UAV including predefined flight parameters based at least in part on a determined orientation of the portable electronic device.

The device can additionally include a camera module, and sensing the orientation of the portable electronic device can include determining an orientation of a vector normal to the camera module. The device can additionally include a display, where the processor is further configured to generate image data indicative of the instructions for control of the UAV, and display the image data on the display. The generated image data can include overlay image data configured to be displayed over images captured by the camera module.

The instructions for control of a UAV can include a flight path of the UAV. The flight path can be defined relative to one or more static GPS coordinates. The flight path can be defined relative to the position of the portable electronic device. The flight path can include a series of GPS waypoints. The flight path can include a predefined flight path which extends along a vector defined by the determined orientation of the device. The instructions for control of a UAV can include instructions for maintaining an orientation of the UAV parallel to a vector defined by the determined orientation of the device.

The instructions for control of a UAV can include instructions for orienting a camera supported by the UAV. The instructions for orienting a camera supported by the UAV can include instructions for orienting the UAV. The instructions for orienting a camera supported by the UAV can include instructions for moving the camera supported by the UAV relative to the UAV.

The device can include a GPS antenna transceiver for determining the GPS coordinates of the portable electronic device, an altimeter for determining an altitude of the portable electronic device, and at least one of an accelerometer and a gyroscope for sensing the orientation of the portable electronic device.

The instructions for control of a UAV can be generated in response to user input. The user input can additionally include a desired UAV velocity. The user input can additionally include a desired UAV travel distance. The user input can additionally include at least one of a desired spacing and orientation of the UAV relative to the portable electronic device. The device can be configured to transmit the instructions for controlling a UAV to a UAV.

Some innovations relate to a method of generating instructions for control of an unmanned aerial vehicle, the method including determining the position and orientation of a portable electronic device, and generating instructions for controlling a UAV, the instructions for controlling a UAV including predefined flight parameters based at least in part on a determined orientation of the portable electronic device.

The portable electronic device can include a camera module, and determining the orientation of the portable electronic device can include determining the orientation of a vector normal to the camera module. The method can additionally include generating image data information indicative of the instructions for control of the UAV, and displaying the generated image data on the display. The method can additionally include generating image data information indicative of the instructions for control of the UAV includes generating overlay image data, and displaying the generated image data on the display can include displaying the overlay image data over images captured by the camera module.

The instructions for control of a UAV can include a flight path of the UAV. The flight path can be defined relative to one or more static GPS coordinates. The flight path can be defined relative to the position of the portable electronic device. The flight path can include a series of waypoints.

The instructions for control of a UAV can include instructions for orienting a camera supported by the UAV. The instructions for orienting a camera supported by the UAV can include instructions for orienting the UAV. The instructions for orienting a camera supported by the UAV can include instructions for moving the camera supported by the UAV relative to the UAV.

Sensing the position of the portable electronic device can include utilizing at least one of a GPS transceiver antenna to determine the GPS coordinates of the portable electronic device and an altimeter to determine the altitude of the portable electronic device, and sensing the orientation of a portable electronic device can include utilizing at least one of an accelerometer and a gyroscope.

The instructions for control of a UAV can be generated in response to user input. The user input can additionally include a desired UAV velocity. The user input can additionally include a desired UAV travel distance. The user input can additionally include at least one of a desired spacing and orientation of the UAV relative to the portable electronic device.

A non-transitory computer readable medium can include instructions that when executed cause a processor to perform any of the methods described above.

Some innovations relate to a device, including a camera module, an orientation sensor, and a processor in data communication with the camera module and orientation sensor, the processor configured to determine a camera view vector based on an orientation of the camera module, and generate predefined operating conditions for control of an unmanned aerial vehicle (UAV) based at least in part on the determined camera view vector.

The predefined operating conditions for control of a UAV can include instructions to move the UAV along at least a portion of a flight path aligned with the camera view vector. The predefined operating conditions for control of a UAV can include further include instructions to return along said portion of the flight path aligned with the camera view vector.

The device can additionally include a position sensor for determining a position of the device, where the predefined operating conditions for control of the UAV are also based at least in part on a determined position of the device. The device can be configured to transmit position information to the UAV, and the predefined operating conditions for control of the UAV can include maintaining a desired spacing or orientation between the UAV and the device.

The predefined operating conditions for control of the UAV can also include geofencing information which constrains movement of the UAV. The predefined operating conditions for control of a UAV include at least one of a starting location, an ending location, at least one waypoint, a flight velocity of the UA, a flight vector of the UAV, a camera orientation of the UAV, and an altitude of the UAV.

Some innovations relate to an apparatus for storing and distributing flight path information for unmanned aerial vehicles (UAVs), the apparatus including data storage for storing flight path information associated with a plurality of UAV flight paths, and a processor in data communication with the data storage, the processor configured to, in response to a request from a remote device, initiate a transfer of flight path information associated with at least one UAV flight path to the remote device.

The flight path information can include the at least one UAV flight path. The flight path can be defined relative to a fixed GPS coordinate. The flight path can be defined relative to a position of a portable electronic device. The flight path can include a series of waypoints.

The flight path information can include at least one of a starting location, an ending location, at least one waypoint, a flight velocity of a UAV, a flight vector of a UAV, a camera orientation of a UAV, and an altitude of a UAV.

The flight path information can include user feedback or rating information associated with the at least one UAV flight path. The at least one flight path can be associated with a fixed GPS coordinate, and the flight path information can include a distance between the fixed GPS coordinate and a position associated with a user initiating the request from the remote device. The at least one flight path can in some embodiments not be associated with a fixed GPS coordinate.

Some innovations relate to a method for allowing UAV pilots to create a flight path profile and upload the same to a central server, allowing access to other UAV pilots. The method can include the steps of having creating a first flight path profile, uploading the flight path profile to a central server, allowing access of the flight path profile to others, and downloading the first flight path profile to a UAV so that the UAV follows the downloaded first flight profile. The flight path profile can include control of three dimensional motion and orientation of a UAV, control of the view orientation of a camera, as well as other camera settings such as video and still image modes, frame rate, and exposure, altitude and speed and dwell times. The position of a UAV can be defined relative to user or tracking device. Movement of a UAV can be restricted to a 3 dimensional volume, 2 dimensional surface, 1 dimensional curve, or zero dimensional point. The flight profile can also include information to facilitate automatic editing of the recorded video, such as the most scenic views or known features of interest. The flight profile can also include recommended audio that matches the nature of the flight profile.

BRIEF DESCRIPTION OF THE DRAWINGS

Various embodiments can be more fully understood from the following detailed description taken in conjunction with the accompanying drawings, in which.

DETAILED DESCRIPTION OF THE PREFERRED EMBODIMENT

Figure 1:
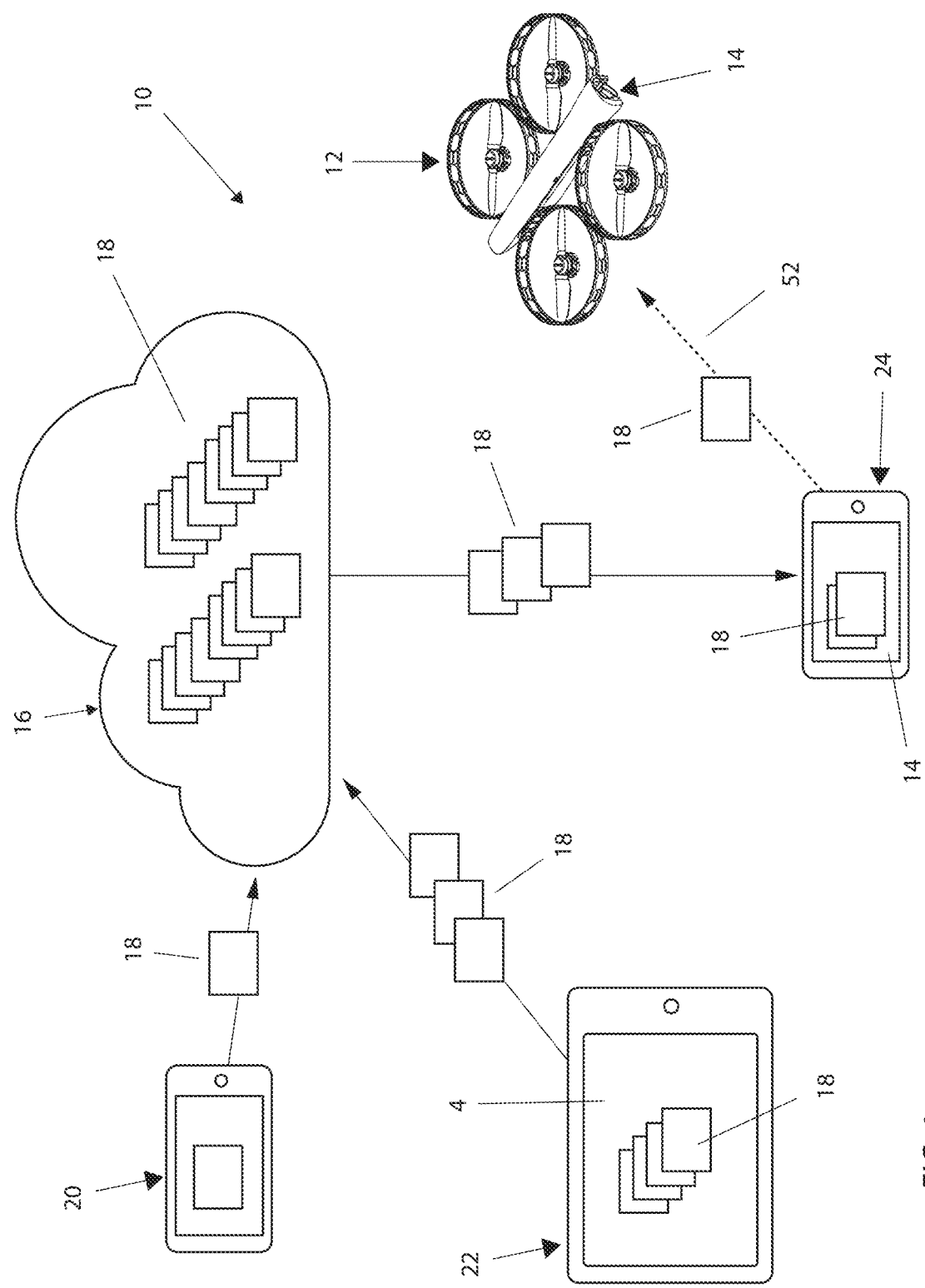
FIG. 1 is a flow diagram showing details of a system for authoring and sharing UAV flight-behavior profiles.

With the advancement of computer processing, GPS, and other technology, quadcopters and other UAVs are now able to fly autonomously, following preset instructions, or following a path defined by so-called "waypoints." Software programs can allow the user (or "pilot") to easily mark at least two waypoints on a digital map. The waypoint information can be converted to flight-control instructions that the control circuitry on the UAV follows (with the help of GPS or other positioning systems), so that the UAV accurately follows the inputted waypoint path. Other programmable instructions can allow the UAV to perform tasks, change yaw, altitude and speed, as it follows the flight path, defined by the preset waypoints. Combined, the flight path and the other programmable instructions effectively control not just the flight path of the UAV, but its "flight behavior."

Controlling the lateral, vertical, and yaw motion of the UAV as well as the pitch, zoom, and/or yaw of the camera, as well as camera controls such as exposure levels, white balance, image quality and frame rates presents a large number of degrees of freedom for one person to do effectively. For this reason, professional UAV operators can use two or more operators for a single UAV, where one operator controls the movement of the UAV and the other operator controls the movement of the camera and camera controls.

One can reduce the number of degrees of freedom and thus the flight challenge by pre-defining constraints that define one or more of the degrees of freedom, letting the operator focus on a smaller number of variables. For instance, one can constrain the path of the UAV to a line, so the operator can focus entirely on the speed of motion along the line, yaw, and camera controls. Alternatively, one could define a constraint of limiting the motion of the UAV to a predefined volume with the direction for the UAV to yaw and pitch the camera in order to keep a user with a tracking device in frame.

Even with the support of flight-planning software, novice UAV pilots still have difficulty creating effective and elegant flight paths for autonomous flight within a particular environment or at a particular location, such as at a specific snowboarding half-pipe at a specific ski resort in Utah, or at Bird Island, a rocky outcrop protruding from the Pacific Ocean near San Diego, Calif.

In some embodiments, UAV pilots are able to create elegant, flight paths for UAVs to follow at various geographic locations, including the accompanying choreographed in-flight movements (behaviors) that the UAV follows during its flight. However, setting up a pre-planned flight path, regardless of skill, is still time-consuming and arguably less fun than flying the UAV.

By reducing the number of degrees of freedom, a compelling flight behavior can be built in multiple stages. A pilot may start by controlling only the position of the UAV along a desired flight path. The UAV can then fly the flight path autonomously, allowing the pilot to adjust the speed and altitude. Once the flight path is determined, the pilot is free to adjust the camera view angle. When all of these flight behaviors are constrained the pilot is free to focus on more creative aspects such as camera zoom, and to repeat the path multiple times making only small adjustments each time.

At least some embodiments discussed herein allow a flight-behavior management system which overcomes the deficiencies of prior systems. At least some embodiments discussed herein provide a flight-behavior management system which allows access of flight-behavior profiles to all UAV pilots. Some embodiments discussed herein provide a tool for creating flight-behavior profiles. At least some embodiments discussed herein enable pilots to capture more compelling video from a UAV.

As used herein, an unmanned Aerial Vehicle (UAV) may refer to a flying device that is controlled either by a user via a communications link such as a radio-frequency (RF) data or other appropriate wireless or wired communications link, by autonomous control, or by an on board program. One common type of UAV is a quadcopter which has four motor driven propellers. When controlled in real time by a user, a hand held controller can be used for adjusting flight parameters such as altitude, velocity, and orientation. Other controllers which do not necessarily use hand held interfaces, such as VR goggles and eye-trackers, may also be used. UAVs may include an on-board camera that can be aimed with additional controls on the hand held controller.

As used herein, a personal computing device may refer to a general purpose computing device, which may include a computing hardware subsystem running an operating system, a display, an input device, RF or other wireless or wired connectivity, and the ability to install and run software applications. Examples of personal computing devices include, but are not limited to, a notebook or desktop personal computer, a tablet, or a smart phone. Other personal computing devices can include the include non-handheld interface devices, such as virtual reality goggles and eye-trackers, which can be used either alone or in conjunction with another personal computing devices.

As used herein, flight behavior refers to the controlled motion and orientation in up to three dimensions of a UAV, although other behavior may also be included, as discussed in greater detail throughout the specification. For example, for UAVs that include a camera, flight behavior may also include control of the view orientation of the camera as well as other camera settings such as video and still image modes, frame rate, and exposure.

As used herein, a flight controller device may refer to a device with a user interface for inputting UAV flight control commands in real time, or otherwise transmitting control data to a UAV via a communications link such as an RF communication link. In certain of the embodiments disclosed herein the RF communication link may include Wifi, although other suitable communication links may also be used, such as Bluetooth, GSM, or any other suitable communication protocol.

A used herein, a ray refers to a mathematical construct that has an end point and a direction.

Embodiments discussed herein allow users of UAVs to create and use flight behavior profiles (flight path and flight behavior control data). Users may also upload such flight behavior profiles to a central storage location, such as a cloud/web-server, providing access of the stored flight behavior profiles to other UAV pilots, as well as additional information associated with the stored flight behavior profiles. The stored flight behavior profiles may be selectively downloaded so their own UAV allowing their UAV to fly following the selected flight behavior profile, quickly and easily.

Referring to FIG. 1, an overall system schematic 10 is shown, including a UAV 12, having a camera 14, an Internet database "cloud" and web-server 16, flight behavior profile data 18, an exemplary uploading smart phone 20, an exemplary uploading tablet device 22 and an exemplary downloading "controlling device" 24, which may be a smartphone, tablet, or other device that includes a communication link with the UAV 12, such as WIFI, Bluetooth, or any other appropriate wireless or wired communication link. Other controllers can include a dedicated device controller, such as a two-stick controller, VR goggles, eye trackers, or any other suitable control device.

Figure 4:
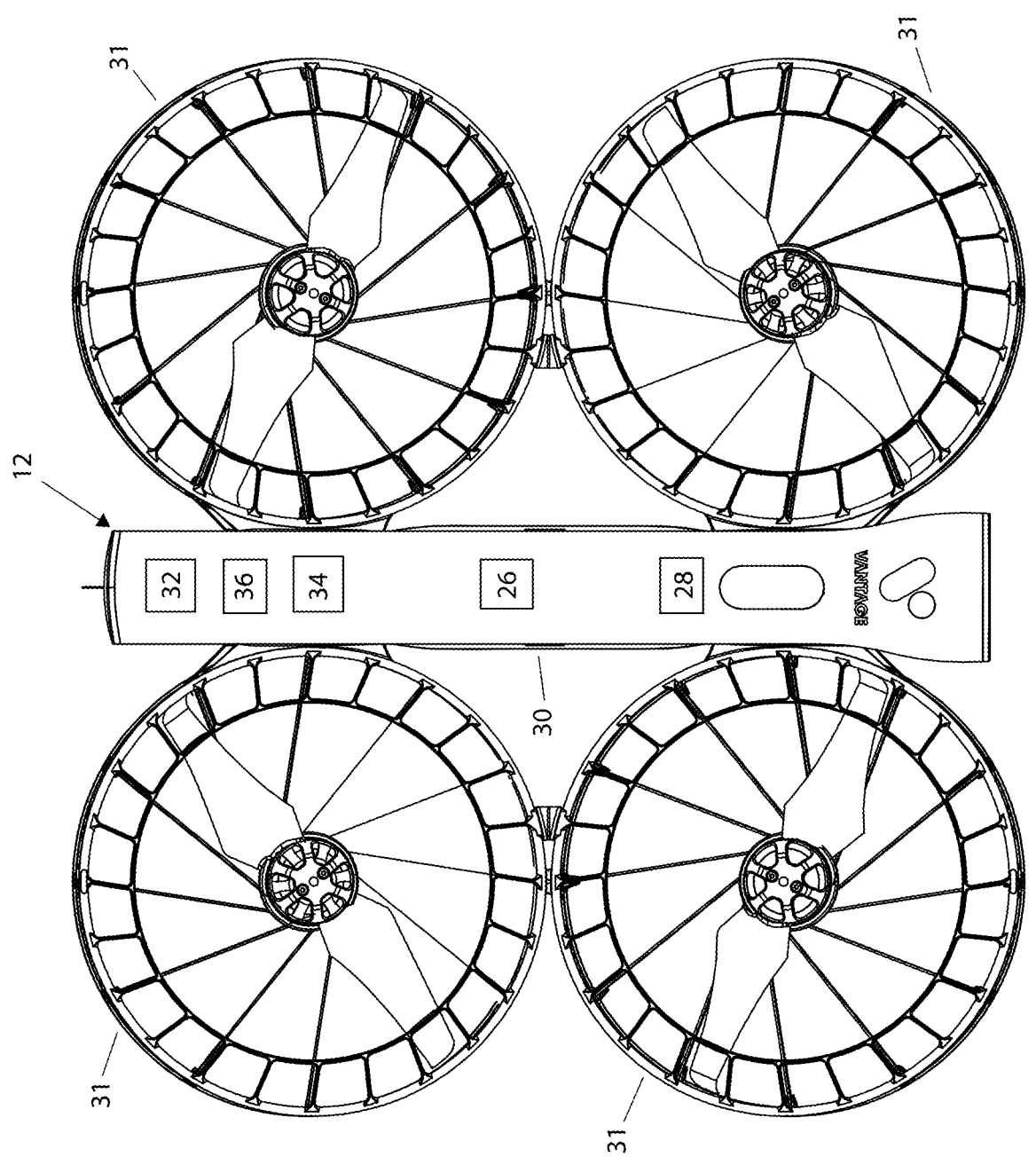
FIG. 4 is a plan view of an exemplary UAV showing details of onboard controlling systems and operational components.

Referring to FIG. 4, in some embodiments a UAV 12 may include components that enable controlled flight, an onboard computer 26 with integral electronic memory, a battery 30, and propulsion components 31 (e.g., electric motors with propellers). Other onboard components can include a GPS transceiver 32, an inertial measurement unit (IMU) 34, a Wifi communication sub-system 36, and a camera system 14. Camera system 14 includes an image sensor (not shown) and associated operating circuitry 15 that is connected to a media processor 28 for compressing or otherwise processing images and video recorded by camera. Camera system 14 is mounted to a t-axis gimbal. The detailed operation of the onboard UAV controlling components is not described in any great detail here. The connections and detailed operation of these components are known to those of skill in this art. However, that being said, computer 26, propulsion components 31, GPS transceiver 32, inertial measurement unit (IMU) 34, a Wifi communication sub-system 36, and camera system 14 and controlling circuitry are all electrically connected to (either directly or indirectly through other components) and powered by battery 30. All such components are in electrical or data communication, either directly or indirectly, with computer 26. During operation, computer 26 receives data from and/or sends data to all components, as understood by those skilled in the art.

In some embodiments, in operation, Wifi communication sub-system 36 of UAV 12 receives controlling data from a smart phone (controller) 24 which is either manually created in real time (manual mode), or is in the form of flight behavior profile data (a data pack) 18. In an embodiment in which the UAV 12 includes other communications components, such as a cellular transceiver, the UAV 12 can also receive controlling data via a cellular network or other network directly from a remote device or server, rather than from a local smart phone or other portable electronic device. The received information is stored in electronic memory 28 and sent to computer 26 for processing. GPS transceiver 32 determines the position of the UAV and sends such positioning data to computer 26 for processing. Also, sensors such as an inertial measurement unit (IMU) 34 can be used in determining relative orientation and speed of UAV 12 and sends such data to computer 26, as required. Computer 26 follows internal programming instructions and received GPS, inertia and flight behavior profile data to control the operation of propulsion components 31 so that UAV 12 flies in accordance with the received flight behavior profile data. Other instructions located within flight behavior profile data may control the operation of camera 14 and other accessories not shown, or such operation may be controlled manually in real time by the user using smart phone 24.

Flight Behavior Profile Authoring Tool

In some embodiments, a flight behavior profile authoring software application is provided which is used to create custom flight behavior profiles 12. Embodiments of such a software program can be adapted for use with various operating systems so such software programs can run on various computing devices, such as personal computers, smartphones, tablets, or running in a browser installed on these devices. Some embodiments of such software programs are designed to work with other mapping software programs, such as Google Earth® to help provide accurate reference points as the user creates a flight path on the screen of the computing device.

Figure 2:
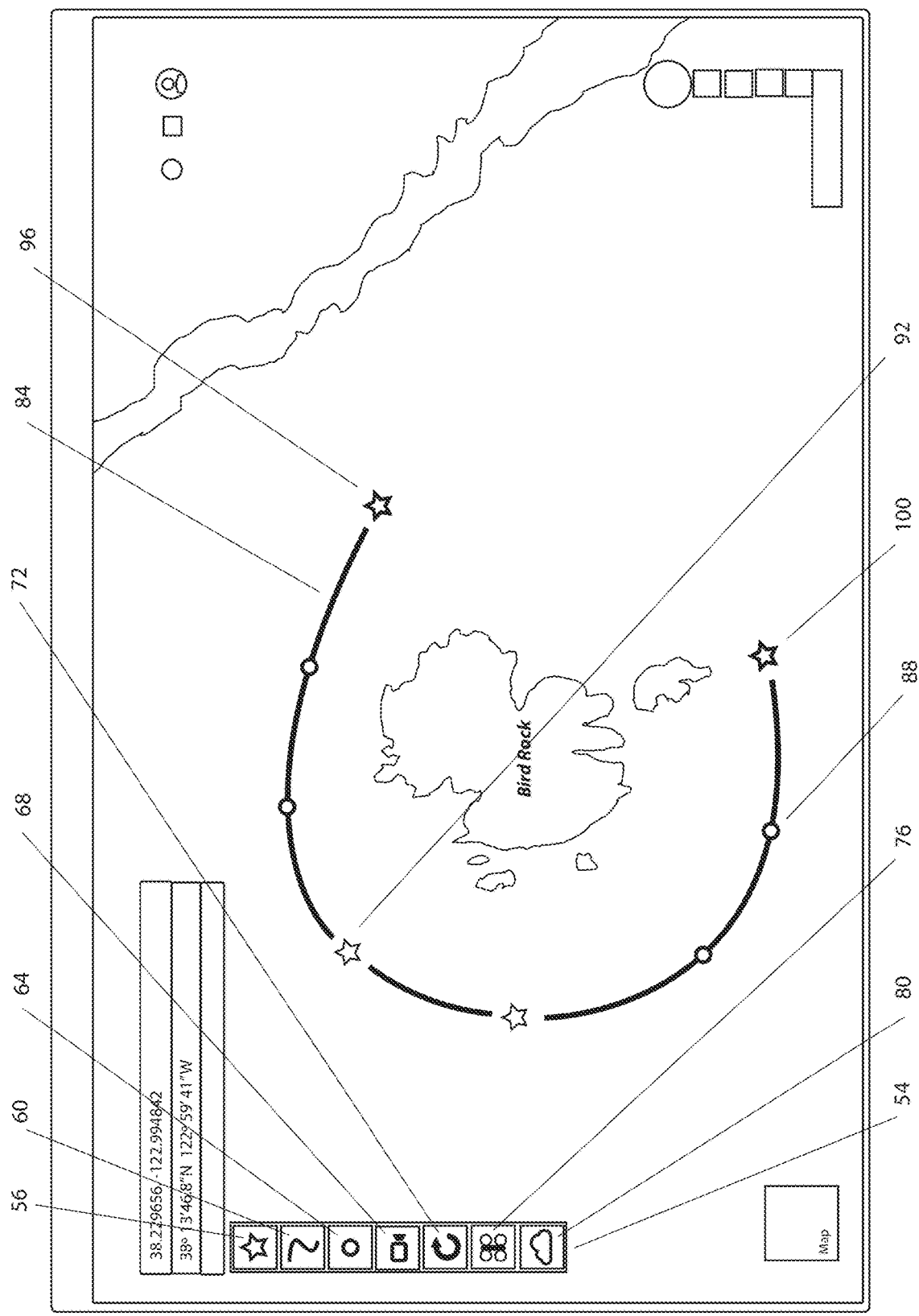
FIG. 2 is an illustrative example of a flight behavior authoring tool graphic user interface, showing map image data of an exemplary geographic location ("Bird Rock") and also showing details of an exemplary overlaid flight path, according to the present invention
Figure 3:
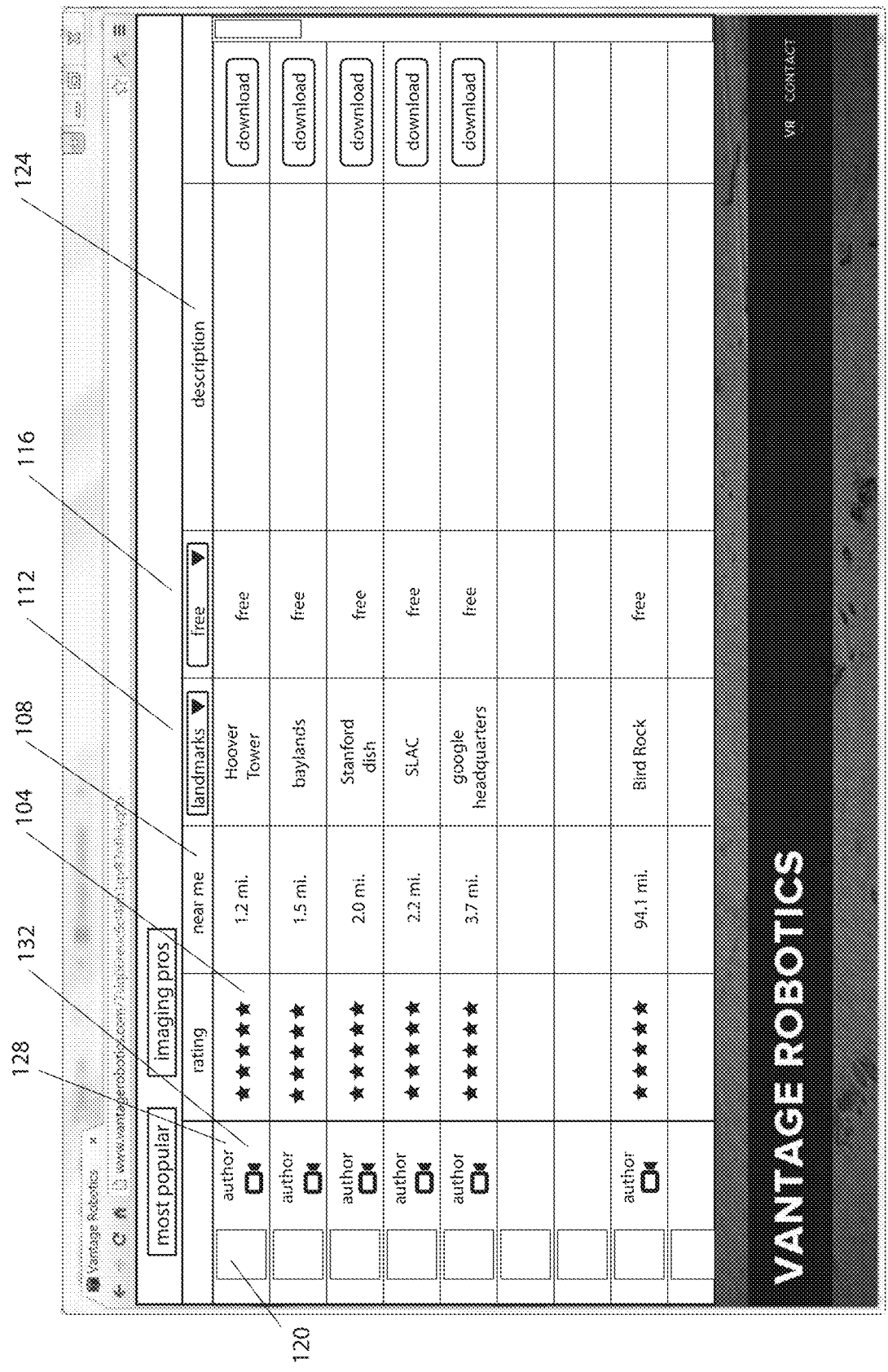
FIG. 3 is an illustrative example of an Internet website showing details of various flight behavior paths that are available for download and use.

Referring to FIGS. 2 and 3, and as an example of operation, a user uses his or her smartphone 20 or tablet 22 (or PC—not shown) to run a flight behavior profile processing application to create a flight behavior profile for the UAV. In the illustrated embodiment, this program provides various useful tools which are activated by control buttons located within a tool bar 54 on the left side of the screen, although a wide variety of other program configurations and interface options may be used. Among the tools which can be provided are a waypoint generator tool (button 56) which is used to place a waypoint on the screen, and a path generator tool (button 60) which is used to create the flight path directly. Other tools can include one or more camera control buttons 68, which provides control of onboard camera system 14 and a transition tool (button 64) which can be used to program a change in altitude and/or speed anywhere along the flight path.

Figure 5:
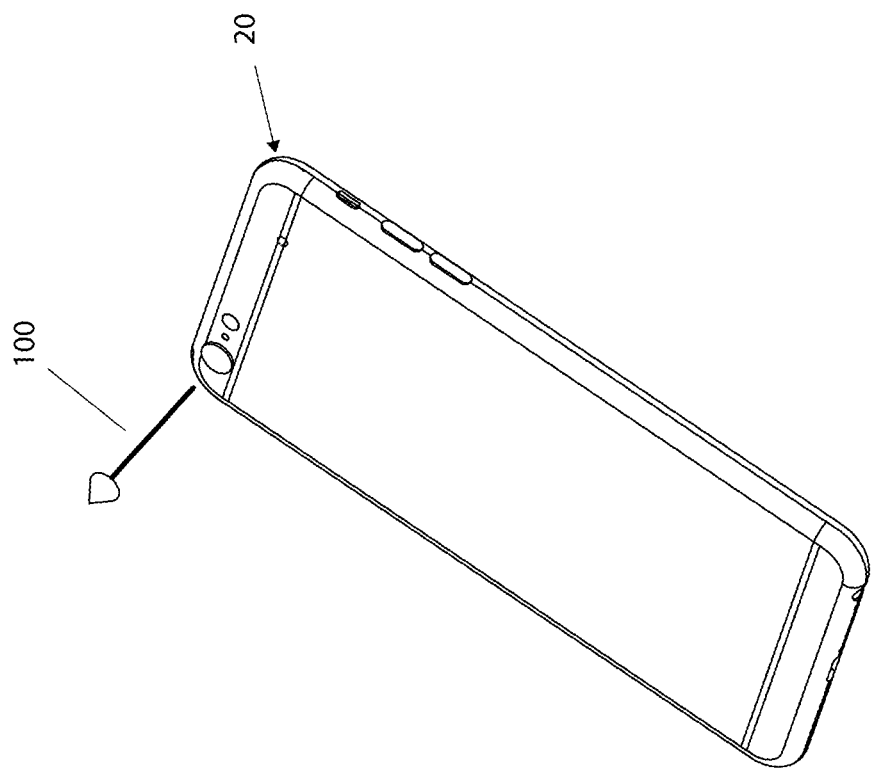
FIG. 5 is an illustrative example of a smartphone showing a flight path ray.

In some embodiments, flight behavior profile authoring tools can include a user interface and software processing functions to enable the user to execute one or more of the following actions:

Change of pitch and/or yaw angle of camera 14 or settings on camera 14 relative to another object, person, or GPS tracking device;

Define the location of UAV 12 relative to another object, person, or GPS tracking device;

Create an initial path 84 by moving along a path on the ground with a device capable of logging location waypoints—for example, using a smartphone 20—and then further editing path 84 by defining additional control path elements such as transitions 88 and the altitude of the path 84;

Combine profile 18 authoring functions, such a flying path that is recorded as a path 84, then providing a user interface to digitally smooth, or add additional paths 84 or transitions 88;

Create an initial linear flight path 84 by holding smartphone 20 such that the GPS coordinate values within the phone combined with phone orientation values (from IMU 36) are used to define a flight path ray construct 100 comprised of a start point at the original GPS coordinate and a direction normal to the large planar surface of phone 20. Flight path ray construct 100 is parallel to and substantially coincident with the view direction of smartphone 20 camera, as shown in FIG. 5. Initial flight path 84 is thus defined in three-dimensional space. In one embodiment smartphone 16 camera mode is used to visualize initial linear path 84 construct by graphically super-imposing the ray construct 100 on smartphone 20 camera display in real time in an augmented reality function. A graphical representation of initial path 84 construct can be edited in a variety of ways including modifying the length, angle, and altitude (visually or by text input) of the path 84 construct, adding stop way points, changing the shape of initial path 84, and adding transitions. In various embodiments, any other suitable flight path parameter can also be adjusted, including UAV speed, UAV yaw angle, camera pitch angle, target tracking, and any other suitable flight path parameter, including but not limited to flight path parameters discussed elsewhere in the present application. Path 84 construct is compiled into a flight behavior profile 12; and Run an optimization post process on existing path 84 for the purpose of increasing the energy efficiency of path 84, or to smooth the path to provide smoother video.

The above actions are merely exemplary, and a flight behavior authoring tool may include any or all of the above programmable actions in addition to a wide other suitable programmable actions. The flight behavior profile may include instructions for controlling a UAV, which include predefined flight parameters, which can allow some or all aspects of the flight behavior of the UAV to be operated autonomously, without the need for direct or contemporaneous user input regarding those aspects of the flight behavior of the UAV.

Once the user is satisfied with the flight behavior profile 18, the user may locally save flight behavior profile 18 to UAV 12 by using the create path profile file tool (button 72). A specific instance of flight behavior profile 12 may include a subset of the total number of control parameter types. In one embodiment, an instance of flight behavior profile 12 includes GPS way points, velocity, acceleration, and altitude parameters, but not camera view vector, which is controlled by the user. This allows the UAV to essentially fly itself, allowing the user to concentrate on taking photographs or video during flight.

Once saved, the user may then upload the saved flight behavior profile 18 to his or her UAV 12. This is done using Wifi communication sub-system 36 communicating with smartphone 20 (or controlling device 24), as is well known and understood. As described above, the uploaded flight behavior profile 18 will be stored in onboard electronic memory 28. At this point, the user may fly his or her UAV 12 so that onboard computer 26 reads the stored flight behavior profile 18 and follows the instructions during flight. On board computer 26 interrogates GPS transceiver 32 and inertial measurement unit (IMU) 34 for location and orientation information to help control propulsion system 31 to ensure that UAV 12 accurately follows flight-behavior profile, as required. As described above, the custom flight behavior profile 18 includes a flight path, UAV orientation details, speed details, altitude details and camera operation details, at each waypoint along the defined flight path. Referring to FIG. 3, in the example shown, flight path begins at "Start" waypoint 96, follows along path 84 until it arrives at waypoint 92, as determined by onboard GPS transceiver 32, at which point UAV 12 stops, as instructed by the created flight behavior profile and awaits for manual user control, or a command to resume defined flight path 84. At this point (waypoint 92), the pilot may use manual controls to operate camera system 14, for example. Continuing, once UAV 12 arrives at waypoint 96 along path 84, a transition command awaits, at which point, UAV 12 will transition to a different altitude, orientation (yaw) and/or speed, as programmed by the user when creating the flight behavior profile 18. UAV 12 continues along path 84 until instructed to stop at "End" waypoint 100.

In some embodiments, created flight behavior profile 18 located in smartphone 20 or tablet 22 (or PC, not shown) may also be uploaded and published directly to Internet database "cloud" and web-server 16 immediately by using the cloud upload and publish tool (button 80) in toolbar 54. This is illustrated in FIG. 1.

In other embodiments, the flight behavior profile may be saved directly to a remote server, either in place of or after the local save discussed above. Similarly, the transfer of the flight behavior file 18 to a UAV 12 need not be directly from the smartphone 20 or tablet 22 to the UAV 12, but may instead be directly from a remote device such as the web-server 16 or another device to the UAV 12 if the UAV includes appropriate communications components, such as a cellular transceiver, to enable such a transfer.

Figure 10:
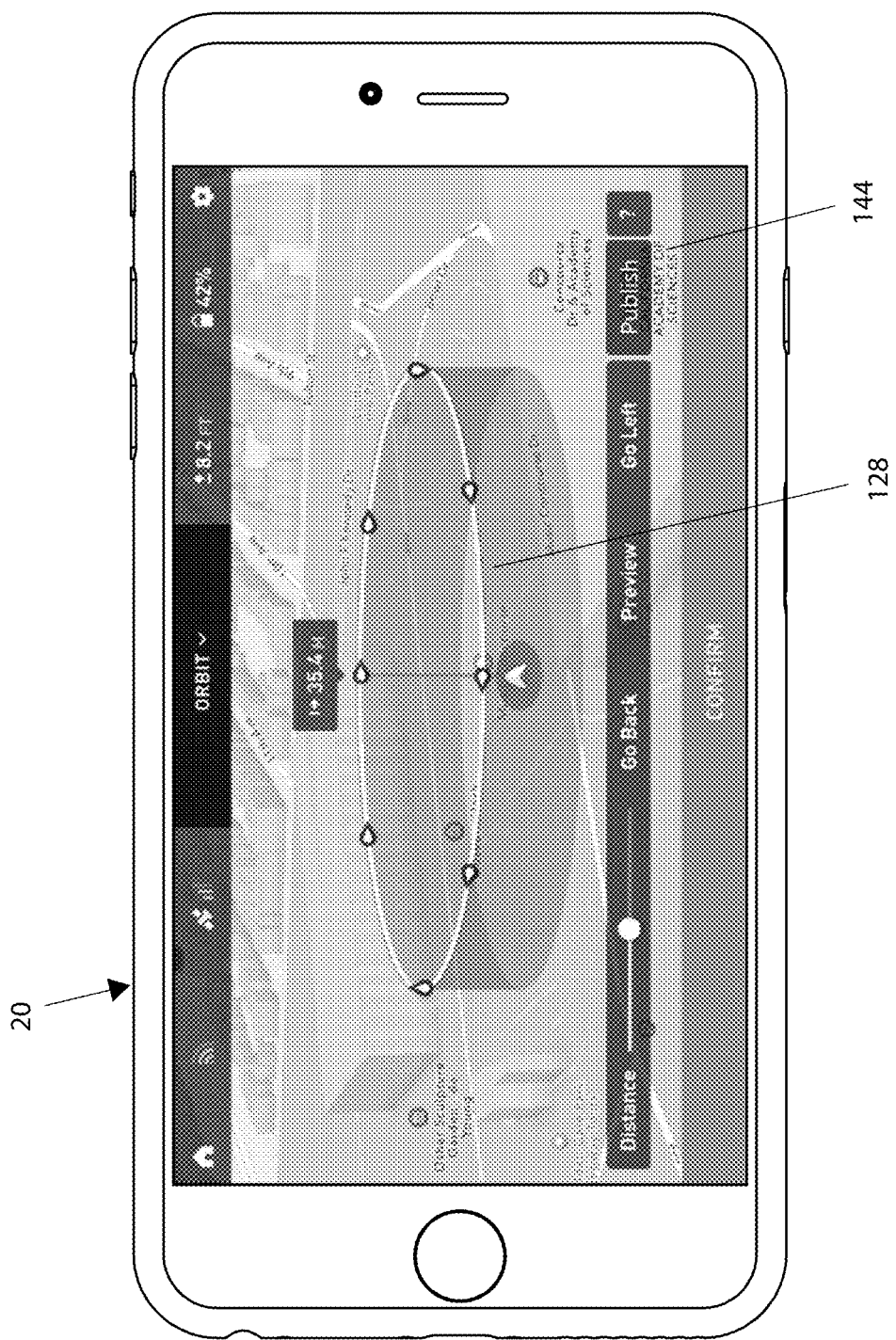
FIG. 10 shows a screen shot of a flight behavior authoring tool user interface with UAV orbit flight path superimposed on a 3D map of the location.

In one embodiment, shown in FIG. 10, a flight behavior profile authoring application or software can include a flight profile publishing function. In such an embodiment, selecting the "Publish" button shown on smartphone 20 display executes a software sub-routine included in behavior profile authoring app that functions to transfer the current flight profile file, in this embodiment an orbit path, to internet database "cloud" and webserver 16. Thus the illustrated orbit path in that current location can be made available for download by other UAV pilots. Additional flight behavior profile app features can include the ability to publish the recorded video file created by the UAV, assign the landmark, and assign a price, or provide any other information pertinent to the presentation of the flight profile as shown in FIG. 4.

In one embodiment, flight profile authoring app includes a user interface setup selection and requisite software sub-routines to automatically send notifications to social media sites, for example to Facebook, when a new flight profile has been selected to be published.

As mentioned above, one version of the flight behavior profile authoring software application is designed to work with other mapping software programs, such as Google Earth® to help provide accurate reference points as the user creates a flight path on the screen of the computing device. As shown in FIG. 2, the user may incorporate known images onto the screen of smartphone 20 or tablet 22, (or PC, not shown), for example, and more easily create the flight path as an overlay over the incorporated map image. This allows the user to accurately create a flight path referenced to known landmarks or structures, such as Bird Rock, as shown in FIG. 2, or buildings, rivers, monuments, rock formations, etc.

In some embodiments, a flight parameter recording software application can be stored onboard UAV 12 in electronic memory 28 and runs on onboard computer 26. Such software allows the pilot of UAV 12 to fly his or her UAV in a particular flight path in real time, changing, as desired, direction, altitude, orientation, speed, camera controls, etc. at any and all times during the flight. In some embodiments, the user has the option of recording the real time generated flight parameters, which include flight path (GPS coordinates at points along the path), speed, orientation, altitude and camera operational details) and storing the same on onboard memory 28. For example, recording the flight parameters can be controlled by depressing a RECORD START button located on the user interface control, when recording is to begin and thereafter depressing a RECORD STOP button, also located on the user interface control, when recording is to stop.

After the flight has ended the recorded flight parameter data may be downloaded to flight controlling device 24 or smartphone 20, or tablet 22 (or PC, now shown) for further processing (formatting the recorded parameter data and create a flight behavior profile 18) and uploading the converted profile 18 to the cloud/web-server 16, as described above, based on the recorded parameters. In contrast to the above described first embodiment wherein a flight behavior profile is created prior to flight, this embodiment allows the user to fly first and thereafter create a record of the flight behavior profile.

Flight Behavior Profile File

In some embodiments, flight behavior profile 18 is a text file with a standardized format readable by a flight behavior authoring tool or flight behavior processing application that has various control parameter types, including: GPS waypoints, GPS stop-and-wait waypoints, velocity, acceleration, altitude, GEO fence (GPS coordinate keep-out, stay-in zones), and camera view vector. As discussed above, this can define the position of a UAV relative to a user or tracking device, and can restrict the movement or orientation of the UAV relative to a 3 dimensional volume, 2 dimensional surface, 1 dimensional curve, or zero dimensional point.

A specific instance of flight behavior profile 18 may include a subset of the total number of control parameter types. In one embodiment, an instance of flight behavior profile 18 includes GPS way points, velocity, acceleration, and altitude parameters, but not camera view vector, which is controlled by the user. This allows the UAV to essentially fly itself, allowing the user to concentrate on taking photographs or video during flight.

A flight profile may include supplemental information which need not be directly related to a given flight path, such as information to facilitate automatic editing of the recorded video, such as the most scenic views or known features of interest. The flight profile can also include recommended audio that matches the nature of the flight profile. The flight profile may thus include additional information which can be utilized by a user either during, before, or after operation of the flight profile, but which does not necessarily place a constraint on the operation of the UAV.

Flight Control Application eferring to FIG. 1, some embodiments use a flight control application software program that runs on controller device 20 and includes a function for browsing and selecting a flight behavior profile 12 from web-server 32. Controller device 20 also includes a software function for uploading a downloaded behavior profile 18 to UAV 12. According to another embodiment, the flight control application also includes a flight profile analysis software function which will automatically estimate the battery energy required to complete the flight plan, based on the flight path data, and will present this energy estimate to the user. According to yet another embodiment, the flight control application factors current local weather conditions into the energy estimate calculation and reports the results to the user.

Out-and-Back Function

Figure 6:
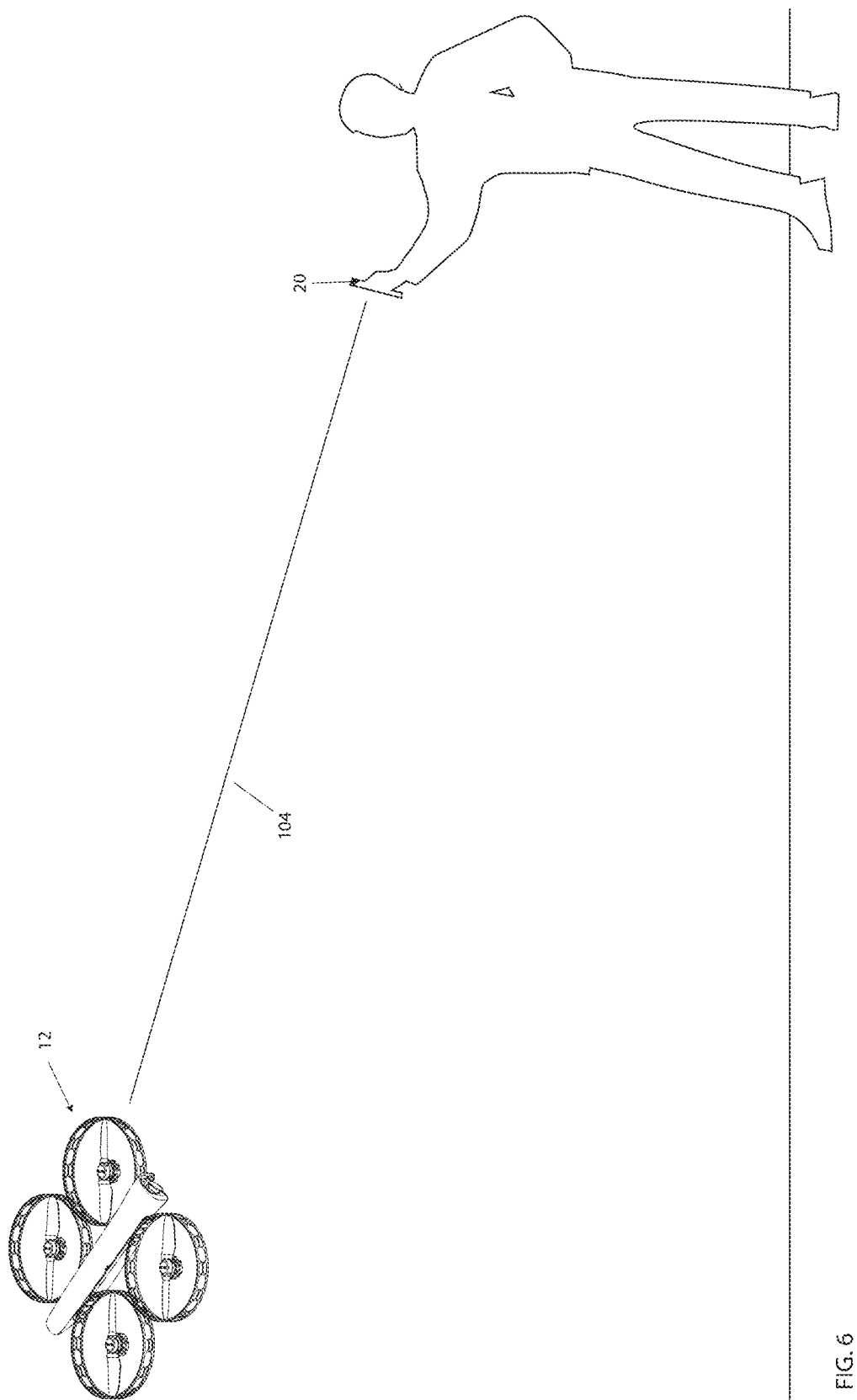
FIG. 6 is an illustrative example of a user with a smartphone creating an out-and-back flight path.

In one embodiment an out-and-back flight path mode is provided as follows. A flight path ray 104 is recorded by a user using smartphone 20 as described above and as shown in FIG. 6, using a flight path processing software app 108, which shows a view of camera output on smartphone 20 display. When the desired direction of flight is shown, the user records flight path ray 104 by using a select button displayed on flight processing app 108 user interface. Flight path processing app 108 stores flight path ray 104 data on smartphone 20. UAV 12 is manually flown by the user to a desired start point. Flight path app 108 requests and receives the current UAV GPS location coordinate, which is now used as flight path ray 104 end point. The user can input flight parameter information, such as a flight velocity value in feet per second and a flight distance value in feet, into flight path software app 108 using user interface. In other embodiments, other flight parameter information may also be used, such as a total flight time.

In some embodiments, the user can manually start the out-and-back function by selecting a start button on user interface of flight path app 108. Flight path processing app 108 commences calculations and transmission of flight path instructions to UAV 12 via Wifi link or other appropriate communications link, causing UAV 12 to move along flight path ray 104 and at the velocity entered by the user. Flight path app 108 can also calculates the angle of UAV 12 camera 14 gimbal based on the orientation and GPS location of UAV and the GPS location of smartphone 20 so that camera view vector remains coincident with smartphone 20. In some embodiments, flight path data and camera 14 gimbal angle data update rate can be approximately 20 hertz during the out-and-back maneuver. In other embodiments, little or no communication can occur between the UAV 12 and the smartphone 20 during an out-and-back maneuver, and the parameters of the out-and-back maneuver can be defined by flight time, velocity, distance traveled, or any combination of these and other flight path parameters. In such embodiments, the UAV 20 can move out of communications range of the smartphone 20 during the maneuver without impacting the performance of the UAV 20.

In some embodiments, the flight path ray can be a ray normal to the camera of the smartphone 20 or other display. In other words, the ray can be aligned with the view of the camera. By utilizing a camera to define the ray along which the flight path of the UAV 20 is aligned, an intuitive user interface can be provided which allows users to easily define a flight path which will move in a desired direction and avoid obstacles. In some embodiments, the smartphone 20 or other control device can detect obstacles in the projected flight path and warn the user, such as through the use of a depth camera, terrain maps or other spatial information, or sensors such as ground-based LIDAR.

The smartphone 20 or other portable electronic device may include a magnetometer or other appropriate sensor to determine the orientation of the phone, and to determine the direction of a ray which may be defined at least in part by the position of the phone. The smartphone 20 may also include other sensors or other components, such as a GPS transceiver or similar structure for determining a geographic position of the device, an altimeter or similar sensor for determining the application of the device, and other sensors such as an accelerometer and/or gyroscope which can be used in measuring the position, orientation, or movement of the device. As discussed above, this can allow the generation of predefined flight parameters, which can be based at least in part on the orientation of the smartphone 20 or other portable electronic device. Even though such predefined flight parameters can be used to control the device, those aspects of the flight behavior controlled by the predefined flight parameter may not require direct or contemporaneous user input. In some embodiments, the flight parameters may include a flight path or UAV orientation which is aligned with or parallel to a ray defined by the orientation of the smartphone 20 or other portable electronic device.

Virtual-Wire Function

Figure 7:
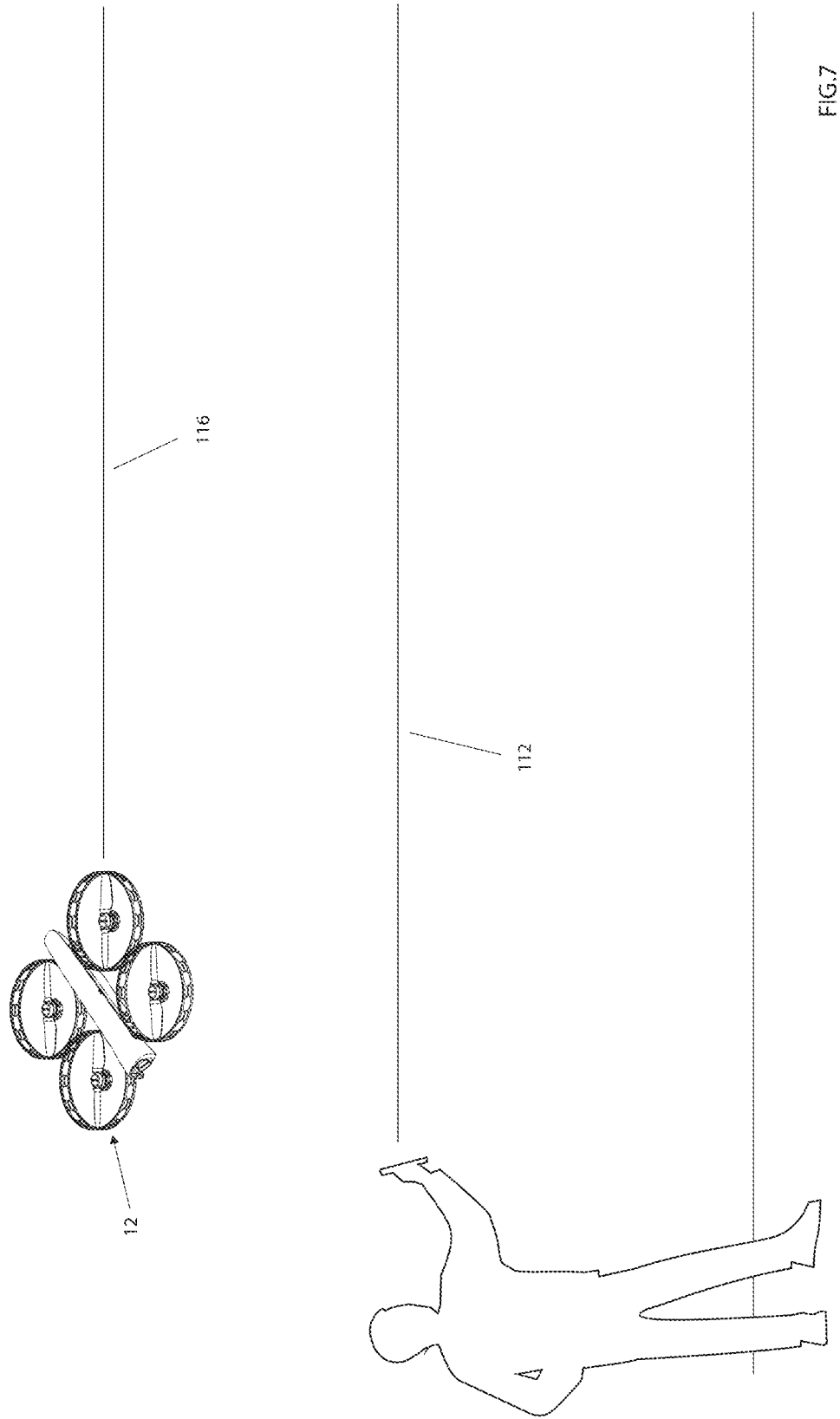
FIG. 7 is an orthogonal view of a virtual-wire flight path.
Figure 8:
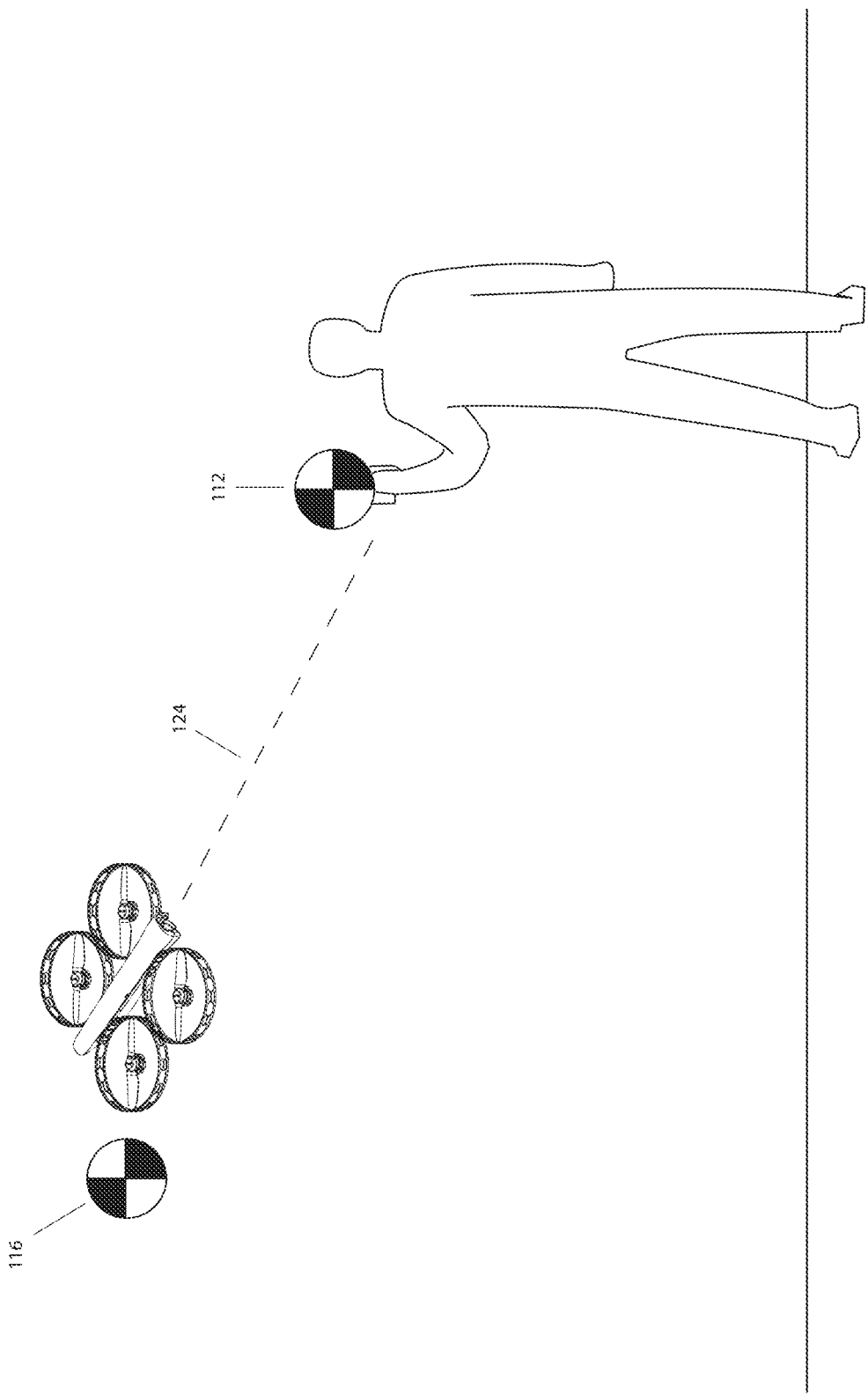
FIG. 8 is a view along a virtual-wire flight path.

In one embodiment a virtual-wire flight path mode is provided as follows. A flight path seed ray 112 is recorded by a user using smartphone 20 as shown in FIG. 7 using flight path processing software app 108, which shows a view of camera output on smartphone 20 display. When the desired flight path is shown, the user records flight path seed ray 112 data by pressing a select button on flight processing app 108 user interface. Flight path processing app 108 stores flight path seed ray 112 data on smartphone 20. The user then manually pilots UAV 12 to a desired start point. Next, flight path software requests and receives UAV 12 current GPS location coordinate, which is now used as a new flight path ray 116 end point. In some embodiments, the flight path can be a line parallel to a ray defined by the smartphone 20 or other control device, and can extend infinitely in both directions along that line. FIG. 8, a view along the axes of flight seed path 112 and flight path 116, shows that flight path 116 is parallel to and offset in elevation or position relative to flight seed path 112.

The user starts the virtual-wire function by activating a start button on flight path processing app 108 user interface. Virtual-wire flight path 116 is calculated by spatially translating flight path seed ray 112 data with UAV 12 GPS coordinate as flight ray end point and with flight path ray parallel to flight path seed ray 112.

Figure 9:
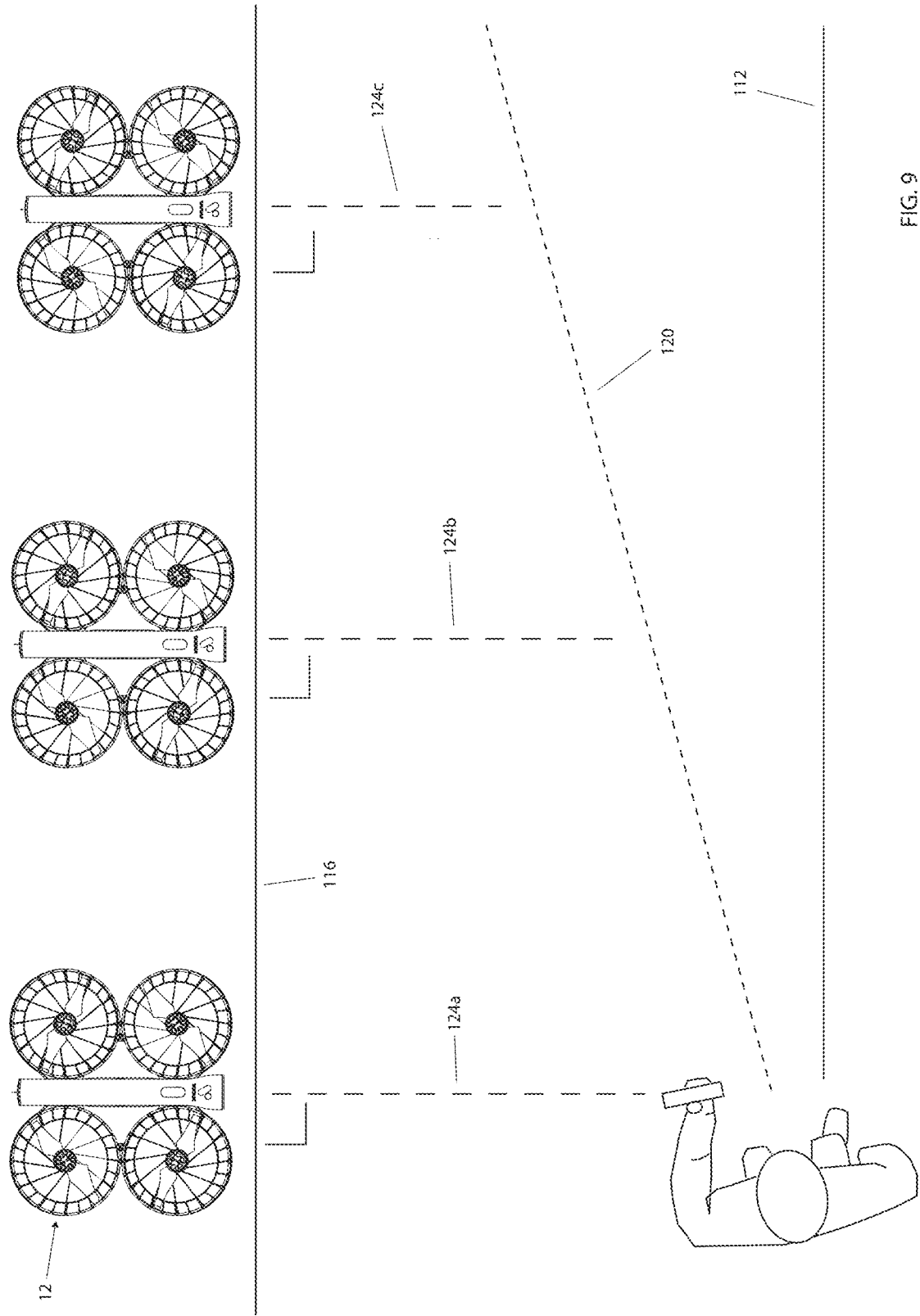
FIG. 9 is a top view of a virtual-wire flight path.

Flight path processing app 108 on smartphone 20 commences calculations and transmission of flight path instructions to UAV 12 via Wifi link, causing UAV 12 to move along flight path 116 corresponding to the movement of the user. FIG. 9 is a top view of UAV 12 flight path with respect to the user. Flight path seed ray 112 and flight path 116 are shown as parallel. In this scenario the user travel path 120 is shown at an angle to flight path 116. In the embodiment shown in FIG. 9, the virtual wire algorithm functions to maintain UAV 12 positioning at the shortest distance between smartphone 20 and flight path ray 116. Stated differently, the line between smartphone 20 and UAV 12 on flight path 116 is always at a right angle to flight path ray 116.

Flight path app 108 also calculates the angle of UAV 12 camera gimbal based on the orientation and GPS location of UAV 12 and the GPS location of smartphone 20 so that camera view direction 124a, b, and c remains coincident with smartphone 20 as the user moves along the travel path. In other embodiments, the image data captured by the camera can be processed or analyzed to track the user, the location of smartphone 20 or another target, so that data communication between the UAV 12 and the smartphone 20 is not necessarily required to track a target. In other implementations, processing or analysis of the captured image data can be used in conjunction with GPS position updates from the smartphone 20.

In another embodiment, flight path app 108 provides the option of setting an angular offset of camera view direction 124 with respect to flight path 116.

In some embodiments, flight path data and camera gimbal angle data update rate can be approximately 20 hertz. In practice the user can walk in any direction at any angle and the algorithm will function to keep camera 14 on the user's smartphone 20.

FIGS. 10-14 illustrate a variety of embodiments of software and controls for authoring flight paths, illustrating flight paths, and/or operating UAVs according to various embodiments discussed herein.

FIG. 10 shows a screen shot of a flight behavior authoring tool user interface with UAV orbit flight path superimposed on a 3D map of the location.

Figure 11:
FIG. 11 shows a live streaming view from the UAV camera with the orbit flight path minimized for reference.

FIG. 11 shows a live streaming view from the UAV camera with the orbit flight path minimized for reference.

Figure 12:
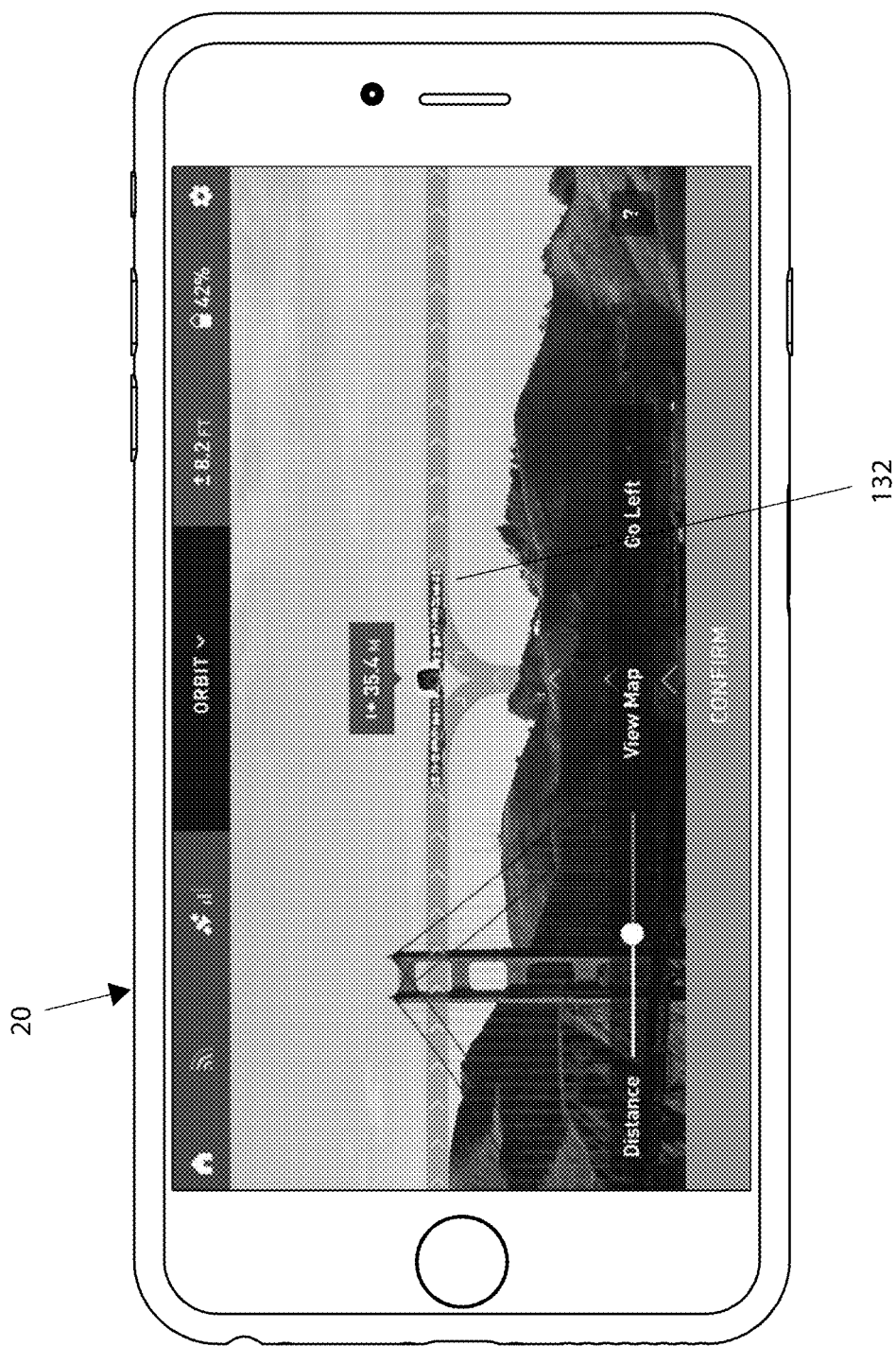
FIG. 12 shows an orbit flight path superimposed on a real time camera view of a location. Selecting the CONFIRM button locks in the flight path to the absolute location in space (augmented reality mode).

FIG. 12 shows an orbit flight path superimposed on a real time camera view of a location. Selecting the CONFIRM button locks in the flight path to the absolute location in space (augmented reality mode).

Figure 13:
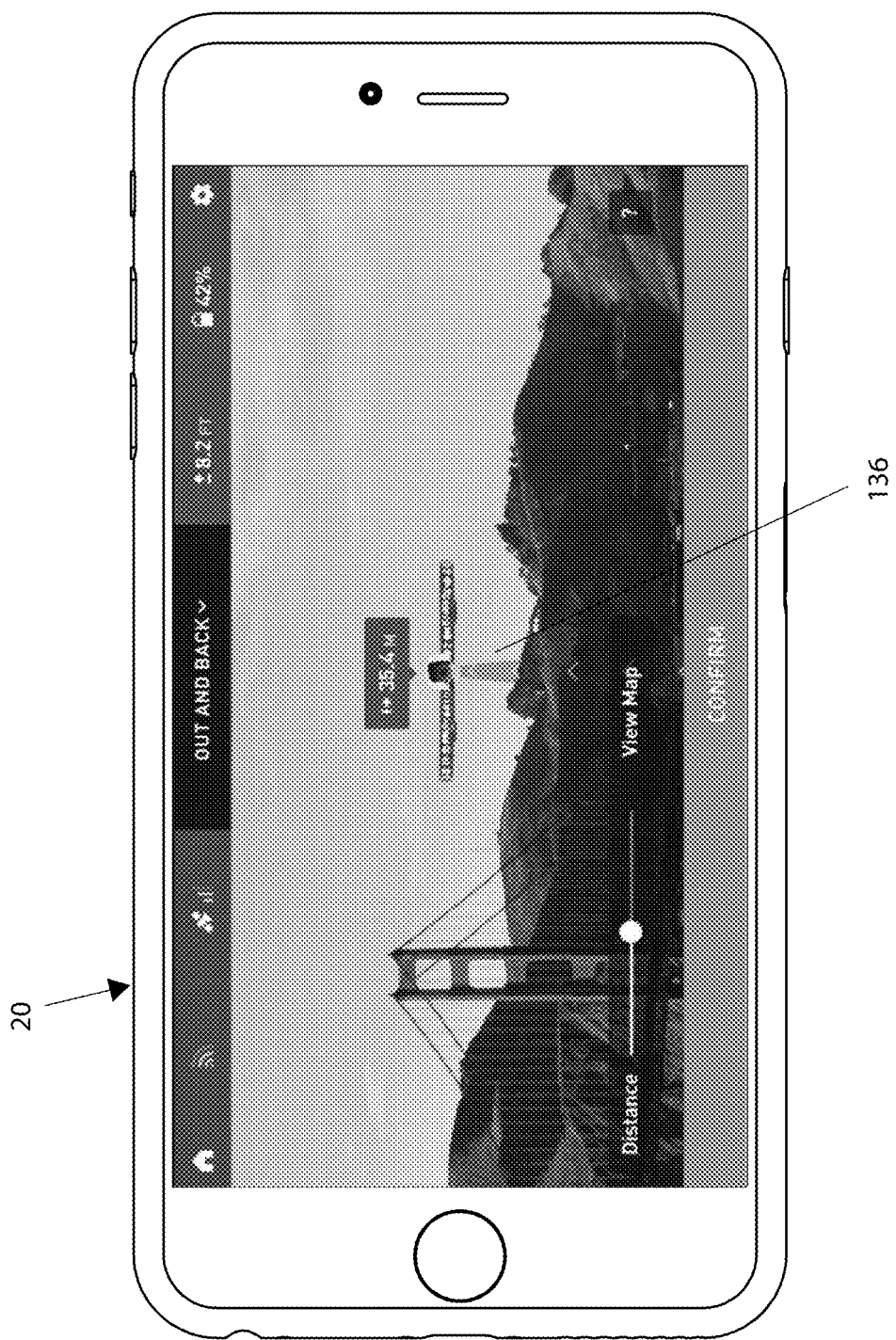
FIG. 13 shows an out-and-back flight path superimposed on a real time camera view of a location. Selecting the CONFIRM button locks in the flight path to the absolute location in space (augmented reality mode).

FIG. 13 shows an out-and-back flight path superimposed on a real time camera view of a location. Selecting the CONFIRM button locks in the flight path to the absolute location in space (augmented reality mode).

Figure 14:
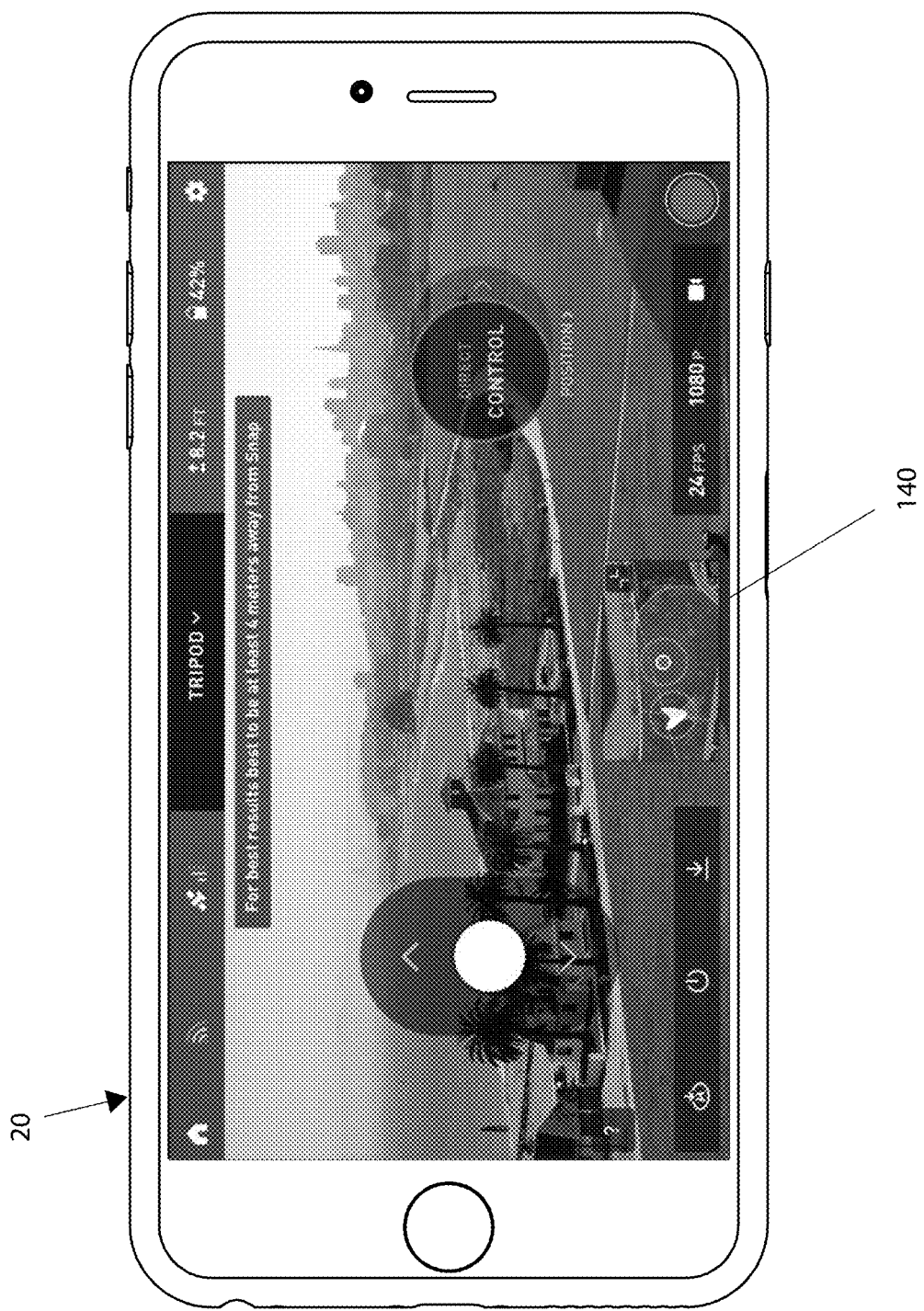
FIG. 14 shows a live streaming view from the UAV camera with the UAV in tripod mode, where it is at a fixed position and the user is able to control the aim of the UAV camera.

FIG. 14. shows a live streaming view from the UAV camera with the UAV in tripod mode, where it is at a fixed position and the user is able to control the aim of the UAV camera.

Flight Profile Internet Database and Webserver

In some embodiments, an internet database and webserver 16 includes mass storage for storing all uploaded flight behavior profiles 18 and associated assets and descriptors. Referring now to FIG. 4, one embodiment of webserver/database 16 includes a web interface for sorting a plurality of behavior profiles 18 based on such criteria as user ratings 104, distance from user's current location 108, categorization of behavior profiles 112 (e.g., terrain exploration, a selfie, sports—with seasonal sub-category), and price 116. In some embodiments, a smartphone application can locally cache all flight profiles within a predefined distance of the user, or a filtered subset of those flight profiles.

Database and web interface 16 includes assets for each behavior profile 12, including: a thumbnail image 120 associated with each behavior profile 18, a text description 124 of the behavior profile 18, a video 132 related to flight profile 18, such as a video 123 shot from a UAV using flight profile 18, an animation of a UAV performing flight profile 18, or another video in some way indicative of flight profile 18; and other videos made by other users with similar flight profile 18.

Web-server 16 includes the capability of serving the content of database 16 in a mobile format so that behavior profiles 18 and the interface and assets described above are accessible from smartphones and tablets, remotely.

In some embodiments, some or all of the information may be provided on a peer-to-peer basis, with flight profiles 18 or other information being transmitted from one mobile device to another.

Referring to FIG. 1, all above described software programs may run on smartphone 20, tablet 22 and controlling device 24. In some embodiments, each of these devices can effectively fly UAV 12, record a flight-behavior profile 18 and upload the profile to the cloud/web-server 16, as desired. Similarly each such device can also access the database 16 using the web interface 16, browse, review and select a stored profile and download the same. Each device can further upload the selected profile to the UAV 12, as desired. In some embodiments, some or all of these functions may be divided between two or more devices. For example, in some embodiments, a flight profile 18 may be created or downloaded using a portable electronic device such as a smartphone 20 or tablet 22. However, when a UAV is operating using the flight profile 18, control over some or all aspects of the UAV operation may be controlled by a separate control device, such as a two-stick controller, which may be in direct or indirect data communication with the UAV. For example, a UAV flight profile 18 which defines a UAV flight path or defines other flight parameters via geofencing may be transmitted to a UAV via a smartphone 20, and during operation of that flight path, camera control or deviations from the UAV flight path may be controlled via a separate two-stick controller.

By way of example, a flight profile 18 is created using the profile authoring software application. The flight profile defines a flight path 84 that extends down a half-pipe at a ski resort. Using the various profile editing functions in tool bar 54 described above and shown in FIG. 3, path 84 is modified with additional flight behaviors, including directing UAV 12 to continually direct camera 14 to record a skier skiing along the path, to follow behind and above the skier, and to start and then orbit around and below the skier for a final mountain framing shot below as the skier exits the half pipe. The user then publishes this flight behavior profile 18 to web-server 16.

Later that week, for example, a second UAV user residing at the same ski resort checks web-server 16 on their smartphone, filters for location, and selects flight behavior profiles 18. The second person reviews several examples of videos 132 made by other profile users using profile 18, as they ride up the chairlift. The second user selects profile 18 to download.

After downloading is complete, the user can select to run the downloaded profile 18 to their UAV 12 and later fly their UAV so that it performs according to the downloaded profile 18. The UAV will accurately repeat the flight path profile and recording video of profile 18, as the second skier skies down the same half pipe. The UAV will follow the desired flight path profile while following the second skier. The resulting video will be slightly different since the behavior on the flight path depends on the location of the target whose location is known by the GPS location of the smartphone and by computer vision aided subject tracking. The second skier then acquires video from their half pipe run and posts a copy of their video on web-server 16 so that others may view and maybe download the flight profile, if desired. The smartphone app or server can automatically edit the video by featuring the jump at the end of the halfpipe and/or prompting the user with a selection of recommended audio tracks made available for licensing.

As described herein, the various functions and steps may be provided in software, hardware, or some combination. Whether functionality is provided in software or hardware may depend on the particular application. Various embodiments may use a general-purpose processor, application-specific hardware or circuitry, or any appropriate combination of a general-purpose processor and application-specific hardware or circuitry. When implemented in software, the functions may be stored or transmitted as instructions or code on a computer-readable medium, such as a processor-executable software module.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

In the foregoing description, specific details are given to provide a thorough understanding of the examples. However, it will be understood by one of ordinary skill in the art that the examples may be practiced without these specific details. Certain embodiments that are described separately herein can be combined in a single embodiment, and the features described with reference to a given embodiment also can be implemented in multiple embodiments separately or in any suitable subcombination. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A portable electronic device, comprising:
   one or more sensors configured to determine an orientation of the portable electronic device, the one or more sensors including a camera module, wherein determining an orientation of the portable electronic device comprises determining an orientation of a camera vector normal to the camera module; and
   a processor, the processor configured to generate a predefined flight path for a UAV, the flight path including directional parameters based at least in part on the determined camera view vector.

2. The device of claim 1, additionally including a display, wherein the processor is further configured to generate overlay image data indicative of the flight path, and display the overlay image data on the display over images captured by the camera module.

3. The device of claim 1, wherein the directional parameters of the flight path include at least one of a waypoint and a flight vector.

4. The device of claim 1, wherein the flight path is defined relative to one or more static GPS coordinates.

5. The device of claim 1, wherein the flight path is defined relative to the position of the portable electronic device.

6. The device of claim 5, wherein the flight path includes a predefined flight path which extends along a vector defined by the determined camera view vector.

7. The device of claim 1, wherein the flight path includes instructions for maintaining an orientation of the UAV parallel to a vector defined by the determined camera view vector.

8. The device of claim 1, wherein the flight path additionally includes instructions for orienting a camera supported by the UAV.

9. The device of claim 1, wherein the device comprises a GPS transceiver for determining the GPS coordinates of the portable electronic device, an altimeter for determining an altitude of the portable electronic device, and at least one of an accelerometer and a gyroscope for sensing the orientation of the portable electronic device.

10. The device of claim 1, wherein the flight path is generated in response to user input.

11. The device of claim 1, wherein the portable electronic device is configured to transmit the flight path to a UAV.

12. A device, comprising:
    a camera module;
    an orientation sensor; and
    a processor in data communication with the camera module and orientation sensor, the processor configured to:
       determine a camera view vector based on an orientation of the camera module; and
       generate predefined operating conditions for control of an unmanned aerial vehicle (UAV), the predefined operating conditions allowing autonomous operation of at least some aspects of flight behavior of the UAV without the need for contemporaneous user input, the predefined operating conditions based at least in part on the determined camera view vector.

13. The device of claim 12, wherein the predefined operating conditions for control of a UAV include instructions to move the UAV along at least a portion of a flight path aligned with the camera view vector.

14. The device of claim 12, additionally including a position sensor for determining a position of the device, wherein the predefined operating conditions for control of the UAV are also based at least in part on a determined position of the device.

15. The device of claim 12, wherein the predefined operating conditions for control of the UAV also includes geofencing information which constrains movement of the UAV.

* * * * *